(12) United States Patent
 Kim et al.

(10) Patent No.: US 8,361,177 B2
(45) Date of Patent: Jan. 29, 2013

(54) POLISHING SLURRY, METHOD OF PRODUCING SAME, AND METHOD OF POLISHING SUBSTRATE

(75) Inventors: Dae Hyeong Kim, Anseong-si (KR); Seok Min Hong, Anseong-Si (KR); Jae Hyun Jeon, Kimcheon-Si (KR); Un Gyu Park, Seoul (KR); Jea Gun Park, Seongnam-Si (KR); Yong Kuk Kim, Seoul (KR)

(73) Assignees: K.C. Tech Co., Ltd. (KR); IUCF-HYU (KR)

( * ) Notice: Subject to any disclaimer, the term of this patent is extended or adjusted under 35 U.S.C. 154(b) by 590 days.

(21) Appl. No.: 12/333,170

(22) Filed: Dec. 11, 2008

(65) Prior Publication Data

US 2009/0133336 A1    May 28, 2009

Related U.S. Application Data

(62) Division of application No. 11/193,094, filed on Jul. 28, 2005, now abandoned.

(30) Foreign Application Priority Data

| Jul. 28, 2004 | (KR) | ......................... 10-2004-0059245 |
| Jul. 28, 2004 | (KR) | ......................... 10-2004-0059246 |
| Aug. 26, 2004 | (KR) | ......................... 10-2004-0067536 |
| Dec. 31, 2004 | (KR) | ......................... 10-2004-0118158 |

(51) Int. Cl.
*B24D 3/02* (2006.01)
*C09C 1/68* (2006.01)
*C09K 3/14* (2006.01)
*C09K 13/00* (2006.01)
*H01L 21/302* (2006.01)
*C09G 1/02* (2006.01)

(52) U.S. Cl. ........... 51/307; 51/309; 252/79.1; 438/692; 106/3

(58) Field of Classification Search .................... 51/298, 51/307, 309; 252/79.1; 438/692; 106/3
See application file for complete search history.

(56) References Cited

U.S. PATENT DOCUMENTS

| 5,772,780 | A  | 6/1998 | Homma et al. |
| 6,043,155 | A  | 3/2000 | Homma et al. |
| 6,221,118 | B1 | 4/2001 | Yoshida et al. |
| 6,299,659 | B1 | 10/2001 | Kido et al. |
| 6,343,976 | B1 | 2/2002 | Yoshida et al. |
| 6,387,139 | B1 | 5/2002 | Kido et al. |
| 6,410,444 | B1 | 6/2002 | Kido et al. |
| 6,420,269 | B2 | 7/2002 | Matsuzawa et al. |
| 6,436,835 | B1 | 8/2002 | Kido et al. |
| 6,447,694 | B1 | 9/2002 | Lee et al. |
| 6,478,836 | B1 | 11/2002 | Kido et al. |
| 6,615,499 | B1 | 9/2003 | Matsuzawa et al. |

(Continued)

FOREIGN PATENT DOCUMENTS

| CN | 1235698 | 11/1999 |
| CN | 1355769 | 6/2002 |
| CN | 1394229 | 1/2003 |
| EP | 1148538 | 10/2001 |

(Continued)

*Primary Examiner* — Pegah Parvini
(74) *Attorney, Agent, or Firm* — Marger Johnson & McCollom, P.C.

(57) ABSTRACT

Disclosed is a polishing slurry, particularly, a slurry for chemical mechanical polishing, which is used in a chemical mechanical polishing process for flattening a semiconductor laminate. More particularly, the present invention provides a method of producing a slurry which has high removal selectivity to a nitride layer used as a barrier film in a shallow trench isolation CMP process needed to fabricate ultra highly integrated semiconductors of 256 mega D-RAM or more (Design rule of 0.13 μm or less) and which decreases the occurrence of scratches on a flattened surface, and a method of polishing a substrate using the same.

5 Claims, 5 Drawing Sheets

U.S. PATENT DOCUMENTS

| | | |
|---|---|---|
| 7,029,509 B2 | 4/2006 | Kim et al. |
| 2001/0034979 A1 | 11/2001 | Lee et al. |
| 2002/0069593 A1 | 6/2002 | Yoshida et al. |

FOREIGN PATENT DOCUMENTS

| | | |
|---|---|---|
| JP | 11181403 | 7/1999 |
| JP | 2003-017446 | 1/2003 |
| KR | 2002029158 | 4/2002 |

POLISHING SLURRY, METHOD OF PRODUCING SAME, AND METHOD OF POLISHING SUBSTRATE

This application is a divisional of U.S. patent application Ser. No. 11/193,094, filed on Jul. 28, 2005 now abandoned, the disclosure of which is incorporated by reference herein in its entirety, which claims priority to Korean Patent Application No. 2004-0059245, filed on Jul. 28, 2004, 2004-0059246, filed on Jul. 28, 2004, 2004-0067536, filed on Aug. 26, 2004 and 2004-0118158, filed on Dec. 31, 2004 in the Korean Intellectual Property Office, the disclosures of which are incorporated herein in their entireties by reference.

BACKGROUND OF THE INVENTION

1. Field of the Invention

The present invention relates to a polishing slurry, particularly, a slurry for chemical mechanical polishing (hereinafter, referred to as 'CMP'), which is used in a chemical mechanical polishing process for flattening a semiconductor laminate. More particularly, the present invention pertains to a method of producing a slurry which has high removal selectivity to a nitride layer used as a barrier film in a shallow trench isolation CMP process needed to fabricate ultra highly integrated semiconductors of 256 mega D-RAM or more (Design rule of 0.13 μm or less) and which decreases the occurrence of scratches on a flattened surface, and a method of polishing a substrate using the same.

2. Description of the Related Art

Chemical mechanical polishing (CMP) is a semiconductor processing technology in which a mechanical process using polishing particles between a pressed wafer and a polishing pad and chemical etching using a slurry are simultaneously conducted, and has been an essential process of global planarization technology in the production of submicron-scaled semiconductor chips since IBM Co., Ltd. in the USA developed it at the end of the 1980's.

The types of slurry are roughly classified into a slurry for oxide, a slurry for metal, and a slurry for poly-silicon according to the type of object to be polished. The slurry for oxide is used to polish an interlayer insulating film and a silicon oxide ($SiO_2$) layer employed in an STI (shallow trench isolation) process, and roughly comprises polishing particles, deionized water, a pH stabilizer, and a surfactant. The polishing particles function to mechanically polish the surface of the object by means of pressure from a polishing machine, and are exemplified by silica ($SiO_2$), ceria ($CeO_2$), and alumina ($Al_2O_3$).

Particularly, ceria slurry is frequently used to polish the silicon oxide layer during the STI process, and in this case, a silicon nitride layer is mainly used as a polishing stopper layer. Hence, an additive is added to the ceria slurry to reduce the removal speed of the nitride layer so as to improve the polishing speed selectivity of the oxide layer to the nitride layer. However, the use of the additive is disadvantageous in that the removal speed of the oxide layer, as well as the removal speed of the nitride layer, is reduced. Furthermore, the polishing agent of the ceria slurry typically has particles larger than those of the silica slurry, and therefore scratches the surface of the wafer.

However, if polishing speed selectivity of the oxide layer to the nitride layer is low, a dishing phenomenon, in which an excessive volume of the oxide layer is removed, occurs due to the loss of adjacent nitride layer patterns. Thus, it is impossible to achieve uniform surface flattening.

Accordingly, the slurry for STI CMP requires high selectivity and polishing speed, dispersion and micro-scratch stabilities, and narrow and uniform particle size distribution. Additionally, the number of large particles having the size of 1 μM or more must exist within a predetermined range.

With respect to conventional technology of producing the slurry for STI CMP, U.S. Pat. Nos. 6,221,118 and 6,343,976, granted to Hitachi Inc., disclose a method of synthesizing ceria particles and a method of producing a slurry having high selectivity using the same. These patents describe characteristics of particles required in the slurry for STI CMP, the type of additives containing polymer, and the production method using them in very critical and wide ranges. Particularly, the patents suggest wide ranges of an average grain size, an average primary particle size, and an average secondary particle size. Particularly, they mention a change of the grain size depending on calcination temperature, and scratches corresponding to this. In another conventional technology, U.S. Pat. No. 6,420,269, granted to Hitachi Inc., discloses a method of synthesizing various ceria particles and a method of producing a slurry having high selectivity using the same. Meanwhile, U.S. Pat. No. 6,615,499, granted to Hitachi Inc., discloses a change of ratios of peak intensities in a predetermined range of X-rays, which depends on a rate of temperature increase in a calcination process, and a change of a removal rate according to this. Furthermore, in the prior arts, U.S. Pat. Nos. 6,436,835, 6,299,659, 6,478,836, 6,410,444, and 6,387,139, which have been made by Showa Denko Co. Ltd. in Japan, disclose a method of synthesizing ceria particles and a method of producing a slurry having high selectivity using the same. These patents mostly describe the types of additives added to the slurry, effects due to them, and a coupling agent.

However, the above prior arts disclose only the average particle size of the polishing particles constituting the polishing slurry and the range thereof, but lack details on how to disperse the particles. If it is considered that a dispersion state and a particle size distribution of ceria powder are very remarkably dependent on the degree of improvement of properties and dispersion stability thereof, and that, therefore, the degree of improvement significantly affects the number of micro-scratches, it becomes very important to find process conditions capable of assuring optimum dispersion stability using properties and dispersion of the ceria powder, which depend on calcination conditions. Furthermore, it is very important to find process conditions capable of assuring optimum dispersion stability by mixing with an appropriate amount of dispersing agent and using dispersing devices, and to provide a slurry formed through the resultant process.

SUMMARY OF THE INVENTION

Accordingly, the present invention has been made keeping in mind the above problems occurring in the prior art, and an object of the present invention is to provide a high performance nano ceria slurry which is capable of being applied in a process of producing ultra highly integrated semiconductors of 0.13 μm or less, particularly, an STI process, and is capable of minimizing micro-scratches that are fatal to semiconductor devices by properly employing a method and a device for pre-treating various particles, a dispersing device and a method of operating the dispersing device, a method of adding a chemical additive and an amount added, and a device for transferring samples.

Particularly, the present invention discloses a change of surface areas of polishing particles by controlling calcination conditions, and a change of dispersion stability according to this in a process of producing powder used as a raw material of a slurry.

Furthermore, where ceria powder and deionized water (DI water) are mixed to produce a slurry, it discloses a change of dispersion stability when dispersion stabilization is conducted using dispersion devices by controlling an optimum amount of a dispersing agent added depending on pH of the slurry and controlling a stage at which the dispersing agent is added.

Based on the above description, the present invention aims to provide a slurry that is capable of minimizing microscratches and maintaining a suitable removal rate and in which dispersion is stabilized.

Another object of the present invention is to provide a method of effectively polishing a semiconductor substrate having a fine design rule using the above slurry.

In order to accomplish the above objects, the present invention provides a polishing slurry which comprises polishing particles in which a surface area per unit weight is changed so as to minimize agglomeration of the polishing particles and improve dispersion stability.

The surface area per unit weight of the polishing particles may be 1-100 $m^2/g$, preferably 3-72 $m^2/g$, and more preferably 5-25 $m^2/g$. A grain size of each of the polishing particles may be 15-40 nm, preferably 18-30 nm, and more preferably 20-25 nm.

The surface area per unit weight of the polishing particles may be controlled depending on a temperature or a holding time of a calcination process.

The present invention provides a polishing slurry, which comprises polishing particles, deionized water, and a dispersing agent and in which agglomeration of the polishing particles is minimized and a variation (dD50) of a median particle size of the polishing particles is 30 or less before and after forcible dispersion treatment, by controlling an amount of dispersing agent added or a stage at which the dispersing agent is added. It is preferable that the variation (dD50) of the median particle size of the polishing particles be 10 or less. Conductivity of the polishing slurry is preferably 300-900 µs/cm, and more preferably 500-600 µs/cm. The dispersing agent is made of an anionic polymer compound, and the anionic polymer compound may be at least one selected from a group consisting of polymethacrylic acid, polyacrylic acid, ammonium polymethacrylate, ammonium polycarboxylate, and carboxyl-acryl polymer.

The polishing particles include ceria.

Furthermore, the present invention provides a method of producing a polishing slurry. The method comprises preparing polishing particles, deionized water, and a dispersing agent; preparing a mixture of the polishing particles, the deionized water, and the dispersing agent; and milling the mixture of the polishing particles, the deionized water, and the dispersing agent.

The preparation of the mixture of the polishing particles, the deionized water, and the dispersing agent may comprise milling a mixture of the polishing particles and the deionized water; measuring a pH of the mixture of the polishing particles and the deionized water; determining an amount of dispersing agent to be added, depending on the pH; and mixing the dispersing agent with the mixture of the polishing particles and the deionized water.

In the determination of the amount of dispersing agent, the amount of dispersing agent added is 2.2-3.0 wt % based on the polishing particles when the pH of the mixture of the polishing particles and the deionized water is 8.7-9.5, 1.4-2.2 wt % based on the polishing particles when the pH of the mixture of the polishing particles and the deionized water is 8.0-8.7, and 0.6-1.4 wt % based on the polishing particles when the pH of the mixture of the polishing particles and the deionized water is 7.4-8.0.

The preparation of the mixture may comprise adding the dispersing agent to the deionized water and mixing them; and mixing the polishing particles with the deionized water to which the dispersing agent is added.

Furthermore, the preparation of the mixture may comprise adding the polishing particles to the deionized water; and mixing the dispersing agent with the deionized water to which the polishing particles are added.

Additionally, the preparation of the mixture may comprise adding the dispersing agent and the polishing particles to the deionized water and mixing them.

The milling of the mixture of the polishing particles, the deionized water, and the dispersing agent may comprise additionally adding the dispersing agent at least one time. The dispersing agent is added in an amount of 0.0001-10 wt % based on the polishing particles in such a way that the dispersing agent added in deionized water is an amount of 100-50% based on a total amount of dispersing agent, and that the dispersing agent added in the course of milling the mixture is an amount of 50% or less based on the total amount of dispersing agent.

The preparation of the polishing particles, the deionized water, and the dispersing agent may comprise producing the polishing particles through a calcination process at a predetermined calcination temperature for a predetermined holding time. The calcination temperature is 500-1000° C. and the holding time is 10 min-10 hours at the calcination temperature in the production of the polishing particles.

The production of the polishing particles may comprise preparing a crude precursor; removing water of crystallization and adsorbed water; removing a carbonate functional group; and conducting recrystallization. The crude precursor includes cerium carbonate.

The method may further comprises adding an additive, including a weak acid or a weak base, to the mixture to control a pH of the slurry; and conducting filtering to remove large particles, after the milling of the mixture of the polishing particles, the deionized water, and the dispersing agent.

As well, the present invention provides a method of polishing a predetermined substrate using the above-mentioned polishing slurry.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a process of producing a polishing slurry according to the present invention and a characteristic analysis of the polishing slurry will be separately described in detail. Furthermore, a description will be given of a method of producing the polishing slurry using ceria as a polishing agent, deionized water as a dispersion medium thereof, and an anionic polymer dispersing agent as a dispersing agent. Additionally, a description will be given of the CMP results, such as an oxide film polishing speed and selectivity, depending on process conditions. Many modifications and variations of the present invention, which will be described later, are possible, and the scope of the present invention is not limited by the following description.

[Production of Ceria Slurry]

Figure 1:
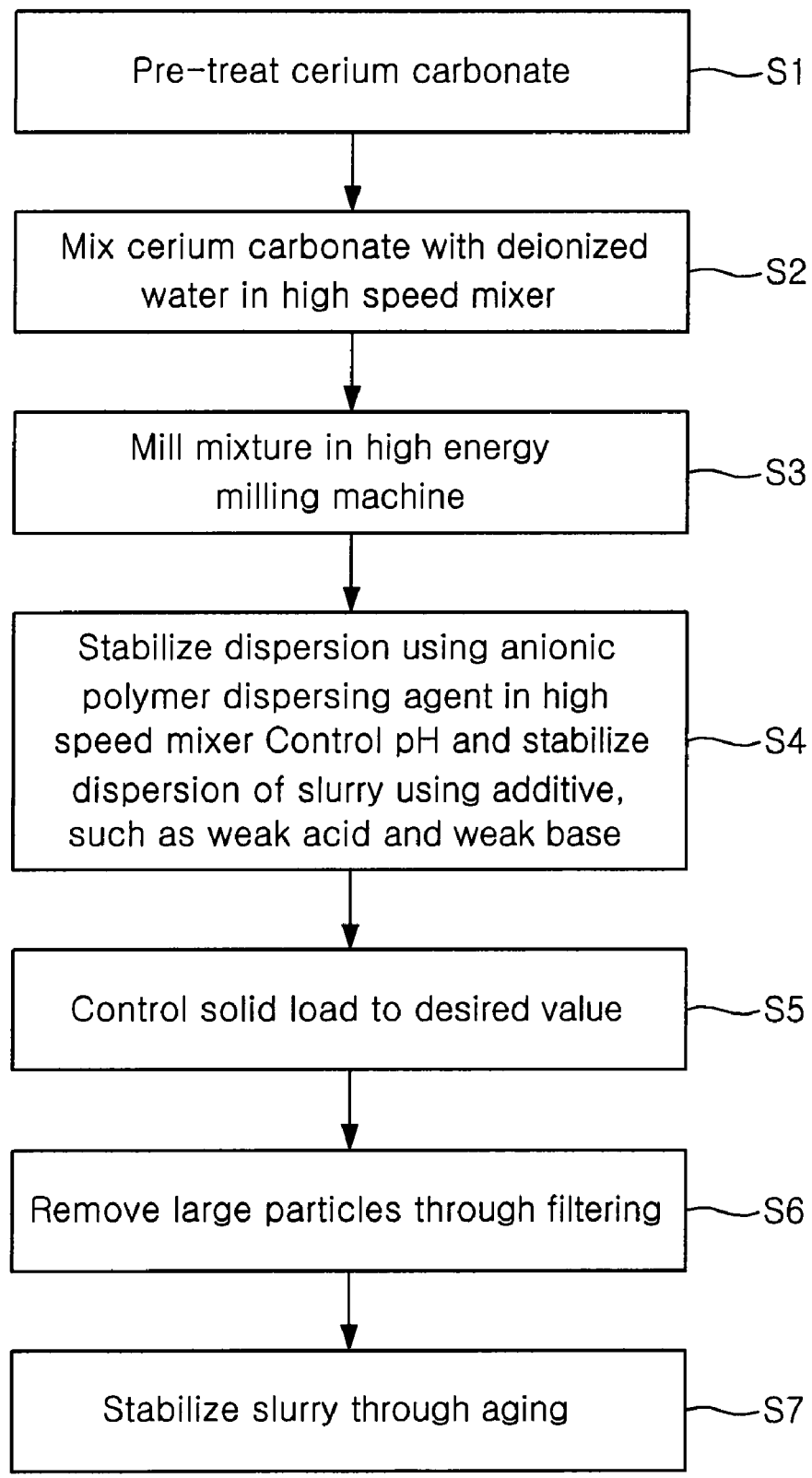
FIG. 1 is a flow chart illustrating the production of a slurry according to the present invention.

The ceria slurry of the present invention is produced so as to contain ceria powder, deionized (DI) water, anionic polymer dispersing agent, and an additive such as a weak acid or weak base. A method of producing the polishing ceria slurry comprises the following steps (see FIG. 1).

First, a precursor, such as cerium carbonate, is pre-treated. That is to say, it is synthesized in a solid phase to prepare the ceria powder (S1). The ceria powder is mixed and wetted with deionized (DI) water in a tank for mixing (S2), and the resulting mixture is milled using a milling machine so as to decrease the particle size and achieve distribution (S3). The anionic polymer dispersing agent is added to the slurry, which is produced according to the above procedure, to increase dispersion stability (S4), and the additive, such as the weak acid or weak base, is mixed with the mixture in a high speed mixer to control the pH. Subsequently, additional milling is conducted to stabilize the dispersion (S5) so that the weight ratio (wt %) of the slurry, that is, the solid load, is desirably set (S6), large particles are removed through filtering to prevent the occurrence of scratches during precipitation and polishing (S7), and additional aging is conducted, thereby the slurry is stabilized (S8). The method of producing the polishing ceria slurry according to the present invention will be stepwise described in detail.

1. Production of Ceria Powder

A first stage of the production of the ceria slurry according to the present invention is to produce the ceria powder from a crude precursor through a solid-phase synthesis method. For example, the precursor, such as cerium carbonate, is calcined to generate the ceria powder, and a separate drying process may be conducted to remove moisture before the calcination. The dried precursor is excellent in terms of transferring and processibility.

Properties of the ceria powder depend on the calcination conditions of cerium carbonate and the construction of a calcination device. Cerium carbonate has water of crystallization and adsorbed water, and water of crystallization typically has a valence of 4, 5, or 6. The calcination conditions depend on the number of water of crystallization and the amount of adsorbed water. After the calcination, water of crystallization and adsorbed water are removed. Thereafter, temperature and heat treatment are increased to cause decarbonation, in which a carbonate functional group is removed in the form of carbon dioxide. Thereby, the ceria powder starts to be generated. Next, additional heat treatment is implemented to cause recrystallization, thereby creating the ceria powder, which consists of various sizes of particles. It is preferable that the calcination be conducted at 500-1000° C.

Crystallinity, the grain size, and the surface area per unit weight depend on the calcination temperature and a holding time of the process. As the calcination temperature and the holding time increase, the grain size or a size of one crystal increases but the surface area is reduced. The related details will be described later.

2. Mixing and Milling

The ceria powder, which is produced through the process as described above, is mixed and wetted with deionized water in a high speed mixer. Subsequently, the mixture is milled to reduce the particle size and disperse particles, thereby a nano-sized ceria slurry is produced.

After the above mixing and wetting, it is preferable that particle size reduction and distribution be conducted using a high energy milling machine so as to control the particle size and to distribute agglomerated polishing particles. The milling machine may be exemplified by a wet or dry milling machine. The dry milling machine may be contaminated by metal pieces caused by the abrasion of metal portions during the milling process, thus it is preferable to conduct the milling process using a wet milling machine made of ceramic. Meanwhile, when using a wet milling process, precipitation and reduction of milling efficiency may occur, and the presence of large particles and a size distribution having a large area may be likely due to agglomeration of the particles, thus it is necessary to control the concentration of the polishing particles, to control a pH and conductivity, and to increase dispersion stability using a dispersing agent. In the present invention, it is preferable to conduct pass-type milling at least three times.

3. Dispersion Stabilization and Addition of an Additive

An anionic polymer dispersing agent is added to the slurry, and the additive, such as the weak acid or weak base, is added thereto to control a pH, thereby stabilizing the slurry. The anionic polymer compound, which is used as the dispersing agent, may be any one selected from the group consisting of polymethacrylic acid, polyacrylic acid, ammonium polymethacrylate, ammonium polycarboxylate, carboxyl-acryl polymer, and a combination thereof. The reason for this is that the slurry of the present invention is based on water and the above polymer compound is soluble in water at normal temperature. In connection with this, it is preferable that the pH of the slurry be 6.5-13. Most preferably, the pH of the slurry is 7-11. Furthermore, it is suitable that the content of the added anionic polymer compound be 0.0001-10.0 wt % based on the polishing particles. It is preferable that the viscosity behavior of the stabilized ceria slurry be Newtonian behavior.

In connection with this, a mixture, which includes the dispersing agent and the additive, is milled using the high energy milling machine to reduce the particle size and to achieve dispersion. Next, the pulverized and dispersed slurry is transferred into a separate tank using a pump, and then dispersed again using an appropriate dispersing device to assure dispersion stability and prevent additional agglomeration and precipitation.

The dispersing agent may be added after the milling step, but, if necessary, it may be added in the course of mixing DI water with the ceria powder before the milling, or may be added during the milling step. Furthermore, the addition may be conducted using a combination thereof. Additionally, it is possible to obtain the slurry having increased dispersion stability by adding an appropriate amount of dispersing agent depending on the pH of the slurry, and a detailed description of this will be given later.

4. Control of Solid Load (Wt %) and Removal of Large Particles

As described above, after a dispersion stabilization process of the slurry is completed, the solid load (wt %) of the ceria slurry is controlled within a desired range, and the large particles which may cause scratches during CMP and may cause precipitation and agglomeration are removed by filtering. It is preferable that the concentration of solid load be 15 wt % or less. When a great volume of the large particles exists, the gravitational force is larger than the dispersion force caused by the repulsive force between the particles, and surface areas of the large particles are smaller than those of the fine particles, thus dispersibility of the large particles is less than that of the fine particles. For the above two reasons, agglomeration and precipitation frequently occur, making the slurry unstable. Therefore, it is necessary to remove the large particles. Furthermore, the removal of the large particles increases as the number of repetitions of filtering for removing the large particles increases.

5. Aging of the Slurry

Stabilization of the slurry by aging is achieved by stirring the slurry in a tank for 24 hours so as to still further stabilize the slurry. This may be additionally conducted using the completed slurry, and may be omitted if necessary.

Figure 2:
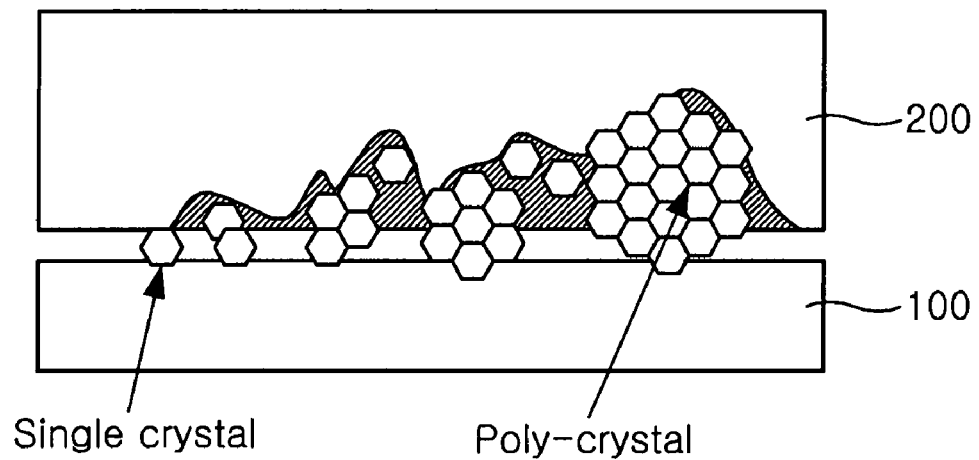
FIG. 2 schematically illustrates a polishing mechanism of a ceria polishing agent.

The polishing slurry may cause generation of micro-scratches, which fatally affect semiconductor devices during the fabrication of ultra highly integrated semiconductors of 0.13 μm or less due to the agglomeration of polishing particles. That is to say, in a polishing mechanism of the ceria polishing agent shown in FIG. 2, a poly-crystal type of ceria particles are broken into single crystals, chemically reacted with oxide films deposited on a wafer, and then removed by a mechanical frictional force to a pad, thereby the polishing is achieved. In connection with this, as agglomeration of the polishing particles increases, the number of micro-scratches increases during breaking of the poly-crystals into single crystals and during breaking of agglomerated secondary particles into smaller secondary particles or primary particles. Therefore, it is necessary to minimize the agglomeration of polishing particles and to increase dispersion stability. In connection with this, a surface area per unit weight of ceria powder, an amount of dispersing agent added, and a stage at which the dispersing agent is added are important factors which are capable of largely affecting dispersion stability of the polishing particles.

dD15 or dD50 may be used as a useful standard for measuring the agglomeration of the slurry. That is to say, a particle size is measured using LA910 manufactured by Horiba, Inc. in Japan, and the results are used to calculate them. Their definitions are as follows.

$$dD1 = D1 \text{ without sonication} - D1 \text{ with sonication}$$

$$dD15 = D15 \text{ without sonication} - D15 \text{ with sonication}$$

$$dD50 = D50 \text{ without sonication} - D50 \text{ with sonication}$$

In connection with this, each term is defined as described below.

Figure 3:
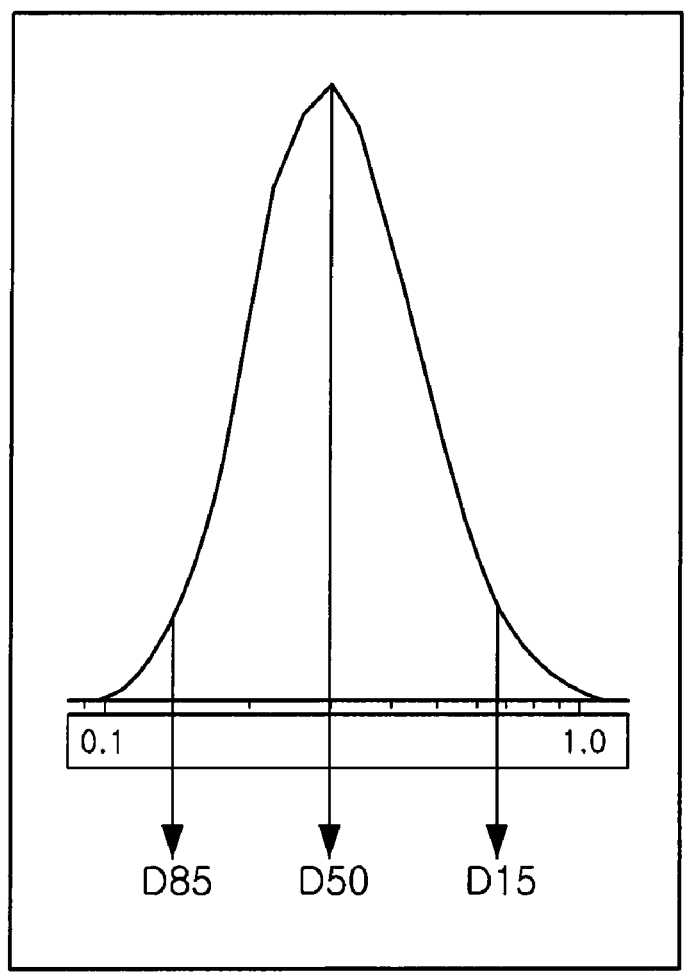
FIG. 3 illustrates a definition of D50 depending on particle size.

D1 without sonication: a D1 particle size measured without exposure to ultrasonic waves D1 with sonication: a D1 particle size measured with exposure to ultrasonic waves D15 without sonication: a D15 particle size measured without exposure to ultrasonic waves D15 with sonication: a D15 particle size measured with exposure to ultrasonic waves D50 without sonication: a D50 particle size measured without exposure to ultrasonic waves D50 with sonication: a D50 particle size measured with exposure to ultrasonic waves FIG. 3 illustrates definitions of D1, D15, and D50 depending on particle size.

As shown in FIG. 3, D1, D15, and D50 correspond to an intermediate size and 50% of a total size distribution. D15 corresponds to 15% of the largest size, and D1 corresponds to 1% of the largest size.

In other words, where the particle size is measured using an LA910 model manufactured by Horiba, Inc., if the measurement is conducted with ultrasonic waves, the agglomerated slurry is redistributed, thus it is possible to measure the particle size in a dispersed state. On the other hand, if the measurement is carried out without ultrasonic waves, the agglomerated slurry is not redistributed, thus the particle size of the agglomerated slurry is measured. Hence, as an agglomerated portion of the slurry increases and as the dispersion stability of the slurry is reduced, variation in the particle size, that is, dD1, dD15, or dD50, increases.

Based on the above description, a detailed description will be given of the effect of calcination process conditions and addition conditions of the dispersing agent on the properties of ceria slurry.

[Change of Properties of Ceria Slurry Depending on the Calcination Process Conditions]

As in the following, the effect of the process conditions of the calcination process on properties of the ceria polishing particles will be analyzed. Particularly, a detailed description will be given of changes of dispersion stability and grain size, which are dependent on the surface area per unit weight of ceria powder depending on the calcination temperature and the holding time, and a change of micro-scratches corresponding to this.

After the surface area per unit weight is changed by changing the calcination conditions, the grain size, and dD1, dD15, or dD50 measured are as follows. In connection with this, the grain size is measured using an X-ray diffraction method, and dD1, dD15, or dD50 is measured using a light scattering method.

TABLE 1

| | Calcination conditions | Surface area (m²/g) | Grain size (nm) | dD1 (nm) | dD15 (nm) | dD50 (nm) |
|---|---|---|---|---|---|---|
| Sample 1 | 700° C. 1 H | 72 | 17.1 | 745 | 303 | 152 |
| Sample 2 | 700° C. 4 H | 17 | 25.2 | 150 | 99 | 51 |
| Sample 3 | 800° C. 4 H | 3 | 35.5 | 75 | 39 | 23 |

As described above, if the surface area per unit weight of the polishing particle can be controlled depending on the calcination conditions, it is possible to control the agglomeration of the polishing particles, and this is closely connected with the number of micro-scratches. As the surface area per unit weight increases, the agglomeration increases, and the increased agglomeration increases the number of micro-scratches based on the above-mentioned polishing mechanism. Furthermore, since the porosity of the particles increases and the hardness of the polishing particles is reduced as the surface area increases, the removal rate is reduced. On the other hand, if the surface area is very small, the grain size increases, causing the generation of large grains and primary particles. Since the large particles have high hardness, the agglomeration may be reduced, but the number of micro-scratches increases due to the generation of large particles. Particularly, as described above, the number of micro-scratches increases as the hardness of the polishing particles increases when breaking the poly-crystals into single crystals and when breaking the agglomerated secondary particles into smaller secondary particles or primary particles. Thus, it is necessary to control the grain size of the polishing particles within a suitable range.

Accordingly, in the present invention, the surface area per unit weight and the grain size of ceria particles are controlled in order to produce a slurry which is capable of minimizing the generation of micro-scratches and maintaining a high removal rate. The surface area per unit weight of ceria particles is 1-100 $m^2/g$, preferably 3-72 $m^2/g$, and more preferably 5-25 $m^2/g$. Furthermore, the grain size of the ceria particles is 15-40 nm, preferably 18-30 nm, and more preferably 20-25 nm.

Figure 4:
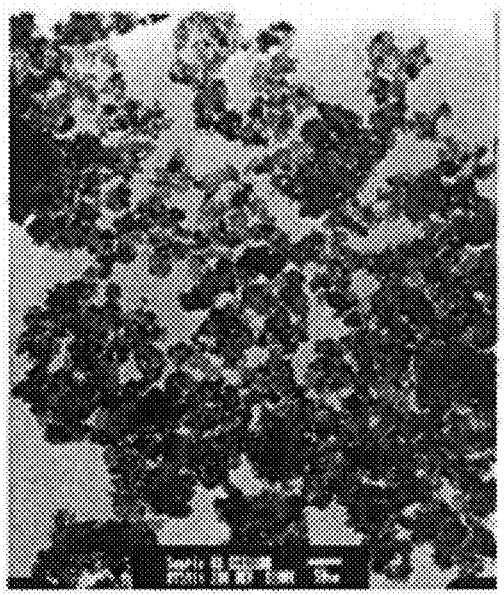
FIG. 4 is a TEM picture of polishing particles calcined at 700° C. for 2 hours.
Figure 5:
FIG. 5 is a TEM picture of polishing particles calcined at 700° C. for 4 hours.

The surface area per unit weight and the grain size of the polishing particle can be controlled depending on the calcination temperature and the holding time during the calcination process. The grain size increases and the surface area is reduced as the calcination temperature increases. As well, from FIGS. 4 and 5 which illustrate TEM pictures of the polishing particle calcined at 700° C. for 1 hour and the polishing particle calcined at 700° C. for 4 hours, respectively, it can be seen that the holding time is in proportion to the grain size.

Hence, in the present invention, in order to produce a slurry which is capable of minimizing the generation of micro-scratches and maintaining a high removal rate, the calcination temperature and the holding time are controlled as described below during the calcination process so that the surface area and the grain size are within the above-mentioned range. To minimize the generation of micro-scratches and maintain a suitable removal rate, the calcination temperature is set to 500-1000° C., preferably 600-800° C., and more preferably 650-750° C. Additionally, the calcination holding time is 10 min-10 hours, preferably 30 min-4 hours, and more preferably 1-2 hours.

[Change of Properties of Ceria Slurry Depending on the Addition Conditions of the Dispersing Agent]

As in the following, the effect of the amount of added dispersing agent and the stage at which it is added on properties of the ceria polishing particles will be analyzed. Particularly, a detailed description will be given of a change of dispersion stability, which is dependent on the optimum amount of dispersing agent added and the stage at which it is added depending on the pH, and a change of micro-scratches according to this.

First, the effect of the amount of added dispersing agent on the dispersion stability of the ceria slurry will be described.

To evaluate the degree of agglomeration depending on the amount of dispersing agent added, dD1, dD15, and dD50 of the polishing slurries produced using variable amounts of dispersing agents were measured, and the results are described in the following Table 2. In other words, sample 4 used 3.82 wt % of dispersing agent, sample 5 used 2.5 wt % of dispersing agent, and sample 6 used 1.6 wt % of dispersing agent. The pHs of all polishing slurries were 9.1, the dispersing agent was added before ceria powder was added to deionized water, and conditions other than the amount of added dispersing agent were the same.

TABLE 2

|  | pH | Dispersing agent (wt %) | Conductivity (μs/cm) | dD1 (nm) | dD15 (nm) | dD50 (nm) |
|---|---|---|---|---|---|---|
| Sample 4 | 9.1 | 3.82 | 975 | 217 | 97 | 49 |
| Sample 5 | 9.1 | 2.5 | 583 | −5 | −1 | 4 |
| Sample 6 | 9.1 | 1.6 | 381 | 70 | 37 | 24 |

In the case of sample 4, even though the amount of dispersing agent is relatively large, agglomeration occurs in a large area without effective dispersion. The reason for this is that, since the amount of dispersing agent is too large, the particles are agglomerated due to a bridging action of the polymer dispersing agent. On the other hand, as for sample 6, the amount of dispersing agent is too small to cause satisfactory dispersion, thus agglomeration occurs in a large area. As described above, since dispersion stability is not increased in proportion to the amount of dispersing agent, the dispersing agent must be added in a suitable amount depending on various conditions, such as the pH and the surface area.

In the case of sample 5, the dispersing agent is added in a suitable amount, thus it is possible to minimize the agglomeration and obtain excellent dispersion stability.

The optimum amount of dispersing agent added is determined depending on the conductivity. As the conductivity increases, the amount of residual dispersing agent increases in a bulk solution, and this means that the dispersing agent is added in an amount that is still more than the optimum amount. In other words, when the conductivity is very high, a lot of dispersing agent is added, causing the agglomeration of particles due to the bridging action of excessive dispersing agent. Accordingly, the amount of added dispersing agent must be controlled depending on the conductivity.

In the present invention, it is preferable that the conductivity be 300-900 μs/cm. More preferably, the conductivity is 500-600 μs/cm. In connection with this, as the amount of dispersing agent added increases, the conductivity increases, and a decrease in the amount of added dispersing agent reduces the conductivity.

As shown in Table 2, if the amount of dispersing agent added is very small, the conductivity is very low and the agglomeration increases due to unsatisfactory dispersion. On the other hand, if the amount of dispersing agent added is very large, the conductivity is very high and the agglomeration increases due to the bridging action of polymer. Therefore, it is important to add the dispersing agent in a suitable amount, which is determined depending on various conditions, such as pH.

In order to evaluate the degree of agglomeration depending on pH to control the addition of the dispersing agent, dD1, dD15, and dD50 of the polishing slurries produced using variable amounts of dispersing agents in variable pHs were measured, and the results are described in the following Table 3. In other words, in sample 5, the pH of the slurry was 9.1, and in sample 7, the pH of the slurry was 8.4. The polishing agents were added in the same amount, 2.5 wt %, to the polishing slurries. Additionally, in sample 8, the pH of the slurry was 8.4, and 1.71 wt % of dispersing agent was added thereto. Other conditions of the polishing slurries were the same.

TABLE 3

|  | pH | Dispersing agent (wt %) | Conductivity (μs/cm) | dD1 (nm) | dD15 (nm) | dD50 (nm) |
|---|---|---|---|---|---|---|
| Sample 5 | 9.1 | 2.5 | 583 | −5 | −1 | 4 |
| Sample 7 | 8.4 | 2.5 | 1764 | 1313 | 529 | 149 |
| Sample 8 | 8.4 | 1.71 | 578 | 18 | 12 | 5 |

Figure 6:
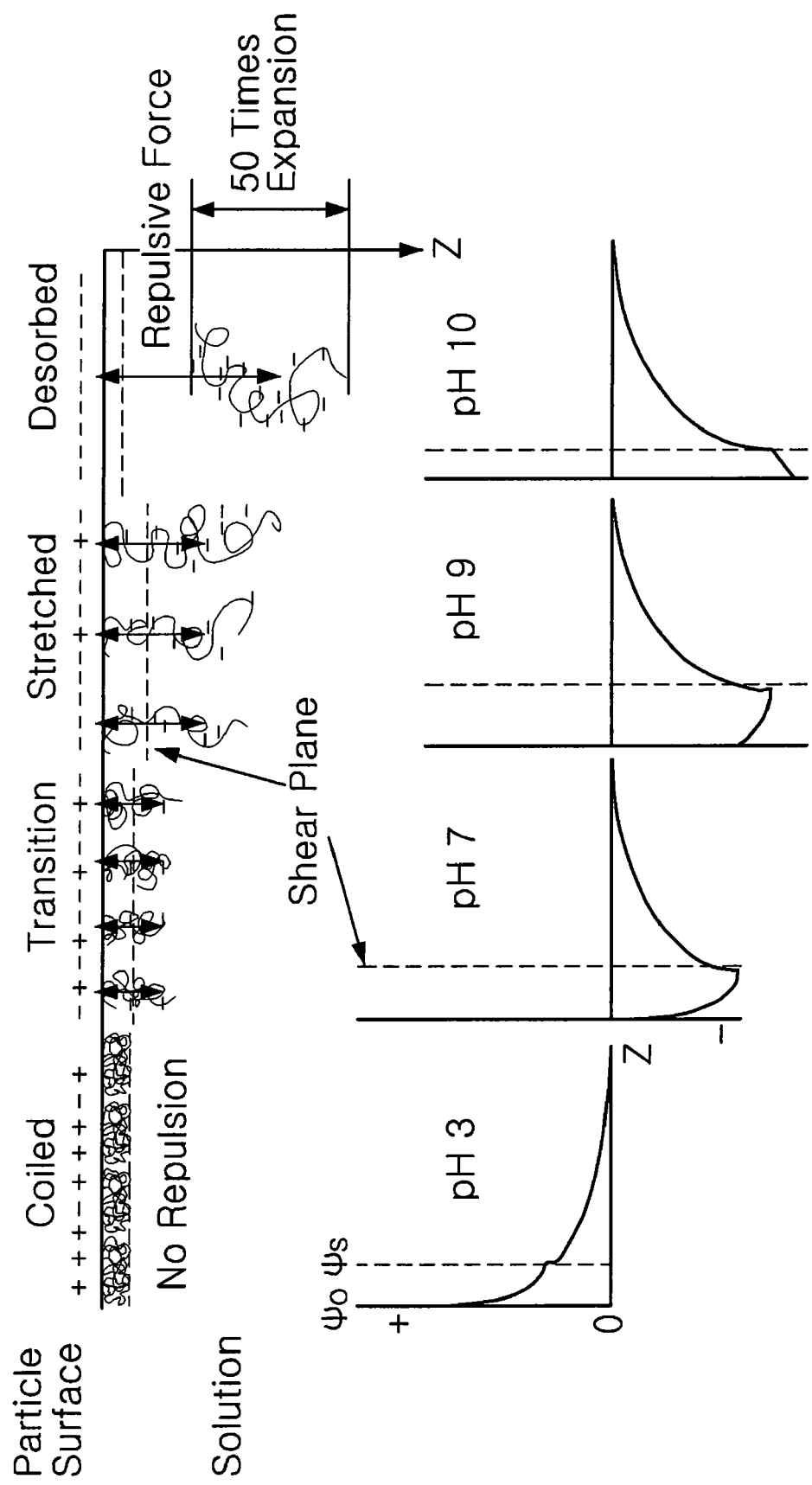
FIG. 6 illustrates adsorption of a dispersing agent depending on pH.

In connection with this, in the case of sample 5, the amount of dispersing agent added was appropriately controlled depending on the pH to minimize the agglomeration. On the other hand, in the case of sample 7, the pH was lower than that of sample 2 and the dispersing agent was added in the same amount, thus the conductivity was rapidly increased, resulting in significantly increased agglomeration. The reason for this is that adsorption of the dispersing agent depends on the pH as shown in FIG. 6. Referring to FIG. 6, if the pH is 3, a particle surface has a positive (+) potential, and an anionic polymer dispersing agent has the shape of a twisted chain and strong adsorption strength to the particle surface. As the pH increases, the particle surface shows a negative (−) potential, thus the surface adsorption strength of the anionic dispersing agent is reduced and the twisted chain of polymer is untwisted. If the pH is as high as 10, the particle surface shows almost completely negative (−) potential, and the anionic polymer dispersing agent has a repulsive force to the particles, thus its chain expands, thereby stabilization is easily achieved in an aqueous solution due to strong forces between ions.

As described above, as the pH is reduced, the adsorption strength of the anionic polymer dispersing agent to the particle surface increases. Therefore, the bridging is excessively increased due to the strong adsorption strength of the dispersing agent, thereby the particles are rapidly agglomerated.

That is to say, by comparing sample 5 to sample 7, it can be seen that the conductivity is very high and the agglomeration increases when the pH is reduced and the adsorption strength of the dispersing agent to the particles increases. Hence, if the pH of the polishing slurry is low, the amount of dispersing agent added must be reduced.

In the case of sample 8, the pH was 8.4, as in sample 7, and the amount of dispersing agent added was controlled. That is to say, sample 7 used 2.5 wt % of dispersing agent and sample 8 used 1.71 wt % of dispersing agent, which is a smaller amount than the above amount. As described above, if the amount of dispersing agent added is reduced while the pH is maintained at a constant 8.4, the conductivity is reduced and reduction of the added amount compensates for an increase in the amount of dispersing agent adsorbed due to the reduction of the pH, thus it is possible to reduce the agglomeration and assure excellent dispersion stability.

As described above, where the amount of dispersing agent added is controlled, it is important to appropriately control the added amount in consideration of the pH of the slurry. The amount of dispersing agent depends on the conductivity, and when the amount is 500-600 μs/cm, dispersion stability is very high.

Furthermore, it is preferable that the amount of dispersing agent added be 2.2-3.0 wt % based on the polishing particles when the pH of the slurry is 8.7-9.5, 1.4-2.2 wt % based on the polishing particles when the pH of the slurry is 8.0-8.7, and 0.6-1.4 wt % based on the polishing particles when the pH of the slurry is 7.4-8.0.

Next, the effect of the stage at which the dispersing agent is added on the dispersion stability of the ceria slurry will be described.

In order to evaluate the degree of agglomeration depending on the stage at which the dispersing agent is added, dD1, dD15, and dD50 of polishing slurries which were produced under variable dispersing agent addition stage conditions were measured. As described above, dD1, dD15, and dD50 each mean variation in the particle size before and after forcible dispersion treatment using ultrasonic waves. In connection with this, ceria powders which were calcined under the same condition were employed to minimize the difference in size and surface area, and milling conditions were controlled so that particle sizes were constant in the course of producing the slurries.

Sample 9 was produced by adding a predetermined amount of dispersing agent before the milling process was conducted, and, in the case of sample 10, a predetermined amount of dispersing agent was added before the milling process was carried out and the dispersing agent was added at least one time during the milling process to produce sample 10. In connection with this, the amount of dispersing agent added and the number of additions before the milling process and during the milling process are controlled depending on the state of the slurry. Additionally, sample 11 was produced by adding the dispersing agent during the milling process, and sample 12 was produced by adding the dispersing agent after the milling process was finished. The variations of the particle sizes, that is, dD15 and dD50, which denote the degree of agglomeration of the polishing particles in the slurries produced under various conditions, were measured, and the results are described in Table 4.

TABLE 4

|  | Stage at which dispersing agent is added | dD1(nm) | dD50(nm) | dD15(nm) |
| --- | --- | --- | --- | --- |
| Sample 9 | Premixing | 33 | 8 | 15 |
| Sample 10 | Premixing and during milling | 8 | 3 | 5 |
| Sample 11 | During milling | 157 | 25 | 51 |
| Sample 12 | After milling | 760 | 152 | 290 |

As shown in Table 4, it can be seen that, in the case of sample 12, that is, where the dispersing agent is added after the milling process, the variation of the particle size is largest, thus the agglomeration of the polishing particles is most serious. Additionally, it can be seen that, like in samples 9 to 11, where the dispersing agent is added before the milling process and/or during the milling process, and where the dispersing agent is added a few times at early and middle steps of the milling process, the variation of the particle size is significantly reduced to 30 or less, thus the agglomeration of the polishing particles is minimized and dispersability is improved in comparison with sample 12.

Figure 7:
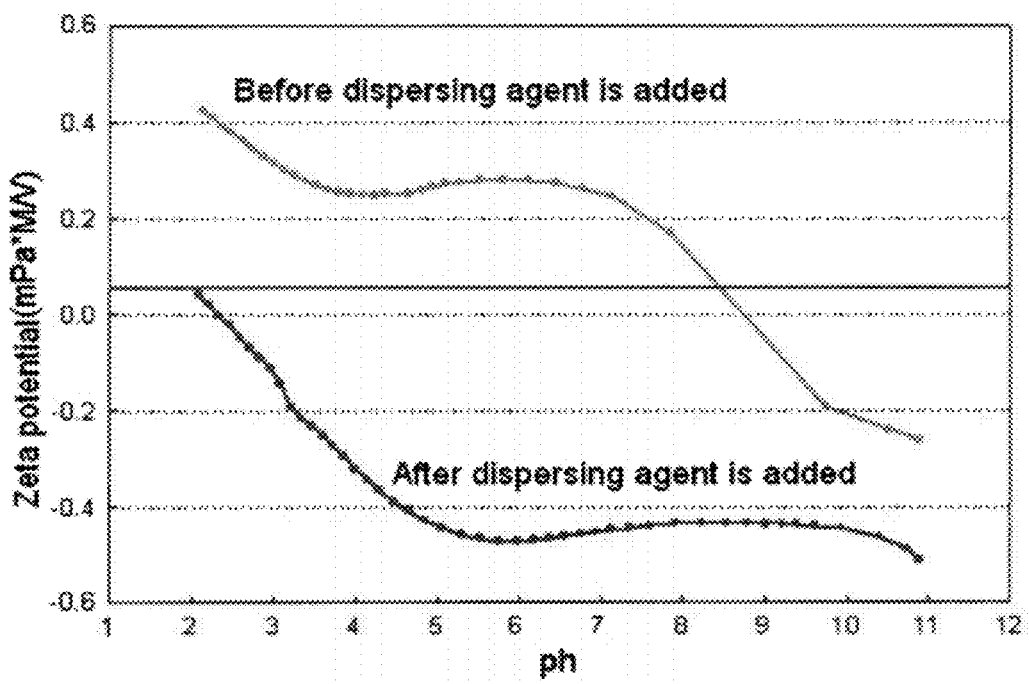
FIG. 7 illustrates surface electric potentials of ceria slurry before and after the dispersing agent is added.

The reason can be considered using a zeta potential as shown in FIG. 7. FIG. 7 illustrates zeta potentials of the slurry before and after the dispersing agent is added. In connection with this, when the dispersing agent is added after milling, as in sample 12, the pH ranges from 5 to 8, and, after addition of the dispersing agent is finished, the pH ranges from 7 to 10. If the milling is carried out without the addition of the dispersing agent, the absolute value of the zeta potential is relatively low in comparison with the case where the milling is conducted with the dispersing agent added, thus pulverization is conducted while a lot of particles are agglomerated. In connection with this, even if the dispersing agent is added after the milling process is finished, it is adsorbed on surfaces of agglomerated secondary particles, thus agglomeration is not reduced. On the other hand, if the milling is conducted with the dispersing agent, dispersability is increased and the agglomeration is reduced due to a relatively high absolute value of a zeta potential. However, where the milling is carried out with the dispersing agent, the dispersing agent may be degraded due to high energy of a milling machine. Accordingly, if the dispersing agent is added in an excessive amount at an early step, dispersion stability is reduced. When the large-sized primary or secondary particles are pulverized into small-sized primary or secondary particles, new surfaces are additionally formed, thus it is possible to achieve effective dispersion by additionally adding the dispersing agent at the middle step so that it is adsorbed on the newly formed surfaces.

Therefore, in the present invention, it is preferable that the dispersing agent be added a few times before and after the milling step. That is to say, the dispersing agent is added at least one time before the milling step, and at least one time during the milling step. To achieve this, it is most preferable that the dispersing agent be added to deionized water and then mixed with the polishing particles, and the dispersing agent be further added to the mixture while it is milled. When the stage at which the dispersing agent is added is controlled as described above, variation (dD50) in the median size of the slurry particles according to the present invention is 30 or less. The variation of the particle size may have a negative value. Preferably, the variation of the particle size ranges from −10 to 10, and, most preferably, it ranges from −5 to 5.

As described above, it is possible to control the agglomeration of polishing particles depending on the amount of dispersing agent added and the stage at which it is added, and this is closely connected to the number of micro-scratches. Particularly, when CMP is carried out in practice, sonication is not conducted. Therefore, the particle size of the secondary particle may be changed by 200 nm or more according to dispersion stability during CMP, and the agglomeration of the polishing particles may cause the generation of micro-scratches during the CMP process.

In the following, the ceria powder and the slurry are produced under predetermined conditions through the above-mentioned method, and the properties of the polishing particles and the slurry, such as the particle size and the number of large particles of the slurry produced under the conditions, are analyzed.

First, analysis equipment is as follows.
1) Surface Area: measured using BET Surface Area ASAP 2010 manufactured by Micromeritics Co. in the USA
2) Grain Size: measured using X'PERT Pro MRB manufactured by Philips company
3) Porosity: measured using Accupyc 1330 manufactured by Micromeritics Co. in the USA
4) pH & conductivity: measured using pH and conductivity meters manufactured by Orion, Inc. in the USA
5) Particle size distribution: measured using LA-910 manufactured by Horiba, Inc. in Japan
6) TEM: measured using JEM-2010 manufactured by JEOL Ltd. in Japan
7) XRD: measured using X'PERT Pro MRB manufactured by Philips company

[Changes in Micro-Scratches Depending on Calcination Conditions]

First, the calcination conditions were controlled to evaluate changes of properties of slurry and micro-scratches depending on surface area per unit weight.

(1) Preparation of Ceria Powders 1 to 3

25 kg of highly pure cerium carbonate was charged in a container by about 800 g, and calcined in a tunnel kiln at 700° C. for 1 hour to prepare ceria powder 1. Additionally, 25 kg of highly pure cerium carbonate was charged in a container by about 800 g, and calcined in a tunnel kiln at 700° C. for 4 hours to prepare ceria powder 2. Furthermore, 25 kg of highly pure cerium carbonate was charged in a container by about 800 g, and calcined in a tunnel kiln at 800° C. for 4 hours to prepare ceria powder 3. In all cases, the rate of temperature increase was 5° C./min during the calcination, cooling was spontaneously conducted, and gas flowed at a rate of 20 $m^3$/hour in a direction that was opposite to a moving direction of a saggar in order to effectively remove $CO_2$ gas generated as a byproduct. The calcined ceria powders were analyzed using X-ray diffraction, and it was confirmed that highly pure ceria powders (cerium oxide) were produced.

(2) Preparation of Ceria Slurries 1 to 3

10 kg of highly pure ceria powder 1, which was synthesized under the above-mentioned conditions, were mixed with 90 kg of deionized water, which included 1 wt % ammonium polymethacrylate as an anionic dispersing agent based on the ceria powder, for 1 hour or more in a high speed mixer so as to achieve sufficient wetting, and the mixture, that is, 10 wt % slurry, was milled using a pass-type milling process. Through the milling process, a particle size was controlled within a desired range and agglomerated particles in the slurry were dispersed. The ceria powders 2 and 3 were prepared through the procedure that was the same as the above-mentioned procedure.

(3) Comparison of the Ceria Slurries 1 to 3 and CMP Test Results

Objects were polished using the ceria slurries produced as described above, and, in this case, the removal rate, the number of scratches, and removal selectivity were evaluated, thereby the slurries were compared to each other. CMP polishing performance tests for the objects were carried out using the ceria slurries 1 to 3 produced as described above. 6EC, manufactured by Strasbaugh, Inc. in the USA was used as a CMP device. An 8" wafer, on which PE-TEOS (plasma enhanced chemical vapor deposition TEOS oxide) was applied to form an oxide film on the entire surface thereof, and another 8" wafer, on which $Si_3N_4$ was applied to form a nitride film on the entire surface thereof, were used as an object wafer. Test conditions and consumption substances were as follows.

1) Pad: IC1000/SUBAIV (purchased from Rodel, Inc. in the USA)
2) Device for measuring a film thickness: Nano-Spec 180 (purchased from Nano-metrics, Inc. in the USA)
3) Table speed: 70 rpm
4) Spindle speed: 70 rpm
5) Down force: 4 psi
6) Back pressure: 0 psi
7) Amount of slurry supplied: 100 ml/min
8) Measurement of residual particles and scratches: measured using Surfscan SPI manufactured by KLA-Tencor, Inc. in the USA Surfaces of the wafers, on which the oxide film (PE-TEOS) and the nitride film ($Si_3N_4$) were formed, were polished using the slurries 1 to 3 which were produced under the conditions for 1 min. The removal rate was determined from a thickness change of the polished film, and the micro-scratches were measured using Surfscan SP1. Particularly, in order to apparently evaluate changes of dispersion stability and the degree of agglomeration depending on a change of the surface area before the CMP test was carried out, the slurries were mixed with deionized water without a re-dispersion process after aging was conducted for 1 month or more before the test was conducted. Polishing performance for the slurries was tested in such a way that polishing characteristics were measured after a blank wafer was polished three times or more.

TABLE 5

|  | Surface area per unit weight | Grain size (nm) | ? Removal rate of oxide film (Å/min) | Removal rate of nitride film (Å/min) | Removal ratio of oxide:nitride (selectivity) | WIWNU (%) | Oxide film residual particles (>0.20 μm, #) | Scratches (#) |
|---|---|---|---|---|---|---|---|---|
| Slurry 1 | 72 | 17.1 | 2332 | 49 | 47.6 | 1.0 | 440 | 3 |
| Slurry 2 | 17 | 25.2 | 2521 | 49 | 51.4 | 1.0 | 150 | 1 |

TABLE 5-continued

|  | Surface area per unit weight | Grain size (nm) | ? Removal rate of oxide film (Å/min) | Removal rate of nitride film (Å/min) | Removal ratio of oxide:nitride (selectivity) | WIWNU (%) | Oxide film residual particles (>0.20 µm, #) | Scratches (#) |
|---|---|---|---|---|---|---|---|---|
| Slurry 3 | 5 | 35.5 | 2680 | 50 | 53.6 | 1.0 | 210 | 2 |
| Comp. Exm. 1 Prior art | 250 | 13 | 2005 | 49 | 40.9 | 1.1 | 780 | 9 |

The CMP test was conducted using the ceria slurries 1 to 3, which were produced so as to have different surface areas of the ceria powders depending on calcination and milling conditions as described above, under the same CMP conditions, and the results are described in Table 5. The ceria slurries 1 to 3 all have fair removal rate and removal selectivity (ratio of oxide film removal to nitride film removal), and also excellent within-wafer-nonuniformity (WIWNU) which indicates removal uniformity of the polished wafer during the polishing process. Furthermore, in all of the ceria slurries 1 to 3, the numbers of oxide film residual particles and scratches are significantly reduced in comparison with slurry according to a prior art. Particularly, with respect to the change of micro-scratches depending on the change of the surface areas of the ceria powders, as the surface area per unit weight increases, dispersion stability is reduced and the agglomeration becomes serious, thus the numbers of oxide film residual particles and micro-scratches are increased. However, if the surface area per unit weight of the polishing particles is reduced, crystallinity is increased to increase the removal rate of oxide film. If large particles are generated because of excessive reduction of the surface area, as in the slurry 3, the number of micro-scratches increases.

[Change in Micro-Scratches Depending on the Addition Conditions of the Dispersing Agent]

First, changes of properties of slurry and micro-scratches, which were dependent on the amount of dispersing agent added, were examined.

(1) Preparation of Ceria Powders 4 to 8

25 kg of highly pure cerium carbonate was charged in a container by about 800 g, and calcined in a tunnel kiln at 700° C. for 4 hours to prepare ceria powders 4 to 8. During all of the calcination processes, calcination conditions other than calcination temperature and holding time were identical to the above-mentioned conditions. The calcined ceria powders were analyzed by X-ray diffraction, and it was confirmed that highly pure ceria powders (cerium oxide) were produced.

(2) Preparation of Ceria Slurries 4 to 8

10 kg of highly pure ceria powder 4, which were synthesized under the above-mentioned conditions, were mixed with 90 kg of deionized water, which included 1 wt % ammonium polymethacrylate as an anionic dispersing agent based on the ceria powder, for 1 hour or more in a high speed mixer so as to achieve sufficient wetting, and the mixture, that is, 10 wt % slurry, was milled using a pass-type milling process. Through the milling process, particle size was controlled within a desired range and agglomerated particles in the slurry were dispersed. The ceria slurries 5 and 8 were produced through the same procedure as was the ceria slurry 4 except that the amounts of dispersing agent added were 2.5 wt % and 1.6 wt %. In the case of the ceria slurries 4 to 6, the pH was titrated to 9.1. The ceria slurry 7 was produced through the same procedure as was the ceria slurry 5 except that the pH was titrated to 8.4 using acetic acid. Furthermore, the ceria slurry 8 was produced through the same procedure as was the ceria slurry 7 except that the amount of dispersing agent added was controlled to 1.71 wt %.

(3) Comparison of the Ceria Slurries 4 to 8 and CMP Test Results

Objects were polished using the ceria slurries produced as described above, and, the removal rate, the number of scratches, and removal selectivity were evaluated, thereby the slurries were compared to each other. CMP polishing performance tests for the objects were carried out using the ceria slurries 4 to 8 produced as described above. In connection with this, a CMP device, an object wafer, test conditions, and consumption substances were the same as those of the above evaluation.

The pH, conductivity, and dD50, dD15, and dD1 values for the slurries were the same as those of Table 2 or 3. That is to say, the ceria slurry 4 was produced using sample 4, the ceria slurry 5 was produced using sample 5, the ceria slurry 6 was produced using sample 6, the ceria slurry 7 was produced using sample 7, and the ceria slurry 8 was produced using sample 8.

TABLE 6

|  | pH | Disp. (wt %) | Cond. (µs/cm) | Removal rate of oxide film (Å/min) | Removal rate of nitride film (Å/min) | Removal ratio of oxide:nitride (selectivity) | WIWNU (%) | Oxide film residual particles (>0.20 µm, #) | Scratches (#) |
|---|---|---|---|---|---|---|---|---|---|
| Slurry 4 | 9.1 | 3.82 | 975 | 2632 | 49 | 53.7 | 1.0 | 460 | 4 |
| Slurry 5 | 9.1 | 2.5 | 583 | 2521 | 49 | 51.4 | 1.0 | 150 | 1 |
| Slurry 6 | 9.1 | 1.6 | 381 | 2580 | 50 | 51.6 | 1.0 | 310 | 2 |
| Slurry 7 | 8.4 | 2.5 | 1764 | 2720 | 52 | 52.3 | 1.0 | 2350 | 32 |
| Slurry 8 | 8.4 | 1.71 | 578 | 2570 | 50 | 51.4 | 1.0 | 180 | 1 |

Disp.: Dispersing agent
Cond.: Conductivity

The CMP test was conducted using the ceria slurries 4 to 8, which were produced so as to have different amounts of dispersing agent added depending on the pH as described above, under the same CMP conditions, and the results are described in Table 6. The slurries 4 to 8 all have fair removal rate and removal selectivity (ratio of oxide film removal to nitride film removal), and also excellent within-wafer-non-uniformmity (WIWNU) which indicates removal uniformity of the polished wafer during the polishing process. The degree of agglomeration or dispersion of the polishing particles and the number of micro-scratches are changed depending on the amount of dispersing agent added. That is to say, since the slurry 4 contains a great amount of dispersing agent, the agglomeration occurs in a large area. The slurry 6 contains a very small amount of dispersing agent, thus the agglomeration occurs in a large area without dispersion, thereby the formed large particles generate micro-scratches. As well, in the case of the slurry 7, since the amount of dispersing agent added is not appropriately controlled as the pH is reduced, the dispersing agent is added in an excessive amount to induce the agglomeration of the particles, thereby the micro-scratches are significantly increased.

As described above, the reason for the agglomeration of the slurry is that, since the amount of dispersing agent added is less than an optimum amount, dispersion efficiency is reduced, or that, since the amount of dispersing agent added is excessively large, agglomeration occurs due to bridging. Accordingly, the dispersing agent must be added in an appropriate amount in consideration of the pH of the slurry.

The amount of dispersing agent suitable for addition must decrease as the pH of the slurry is reduced. It is preferable that the amount of dispersing agent added be 2.2-3.0 wt % based on the polishing particles when the pH of the slurry is 8.7-9.5, 1.4-2.2 wt % based on the polishing particles when the pH of the slurry is 8.0-8.7, and 0.6-1.4 wt % based on the polishing particles when the pH of the slurry is 7.4-8.0.

The preferable amount of dispersing agent is obtained when the conductivity is 300-900 μs/cm, and more preferably, it is obtained when the conductivity is 500-600 μs/cm.

Next, changes in the properties of slurry and micro-scratches, which were dependent on a stage at which the dispersing agent was added, were examined.

(1) Preparation of Ceria Powders 9 to 11

25 kg of highly pure cerium carbonate was charged in a container by about 800 g, and calcined in a tunnel kiln at 700° C. for 4 hours to prepare ceria powders 9 to 11. During all of the calcination processes, calcination conditions other than calcination temperature and holding time were identical to the above-mentioned conditions. The calcined ceria powders were analyzed by X-ray diffraction, and it was confirmed that highly pure ceria powders (cerium oxide) were produced.

(2) Preparation of Ceria Slurries 9 to 11

The ceria slurry 9 was produced using 10 kg of highly pure ceria powder 9, which was synthesized under the above-mentioned conditions. First, 1 wt % ammonium polymethacrylate as an anionic dispersing agent based on the ceria powder was added to 90 kg of deionized water, and sufficiently mixed in a high speed mixer. Subsequently, 10 kg of highly pure ceria powder 9 were added to deionized water which was uniformly mixed with the anionic dispersing agent, and mixing was conducted in the high speed mixer for 1 hour or more so as to achieve sufficient wetting. Next, the mixture, that is, 10 wt % slurry, was milled using a pass-type milling process. Through the milling process, particle size was controlled within a desired range and agglomerated particles in the slurry were dispersed. Subsequently, filtering was conducted to remove the large particles, thereby the ceria slurry 9 was created.

The ceria slurry 10 was produced using 10 kg of ceria powder 10. First, 0.5 wt % ammonium polymethacrylate as an anionic dispersing agent based on the ceria powder was added to 90 kg of deionized water, and sufficiently mixed in a high speed mixer. Subsequently, 10 kg of highly pure ceria powder 10 were added to deionized water which was uniformly mixed with the anionic dispersing agent, and mixing was conducted in the high speed mixer for 1 hour or more so as to achieve sufficient wetting. Next, the mixture, that is, 10 wt % slurry, was milled using a pass-type milling process. During the milling process, 0.5 wt % ammonium polymethacrylate as the anionic dispersing agent based on the ceria powder were further added thereto, and mixing was conducted. Through the milling process, a particle size was controlled within a desired range and agglomerated particles in the slurry were dispersed. Subsequently, filtering was conducted to remove large particles, thereby ceria slurry 10 was created.

Furthermore, 10 kg of ceria powder 11 and 90 kg of deionized water were mixed in a high speed mixer for 1 hour or more so as to achieve sufficient wetting, and the mixture, that is, 10 wt % slurry, was milled using a pass-type milling process. During the milling process, 1 wt % ammonium polymethacrylate as the anionic dispersing agent based on the ceria powder was further added thereto, and mixing was conducted. Subsequently, the milling was further carried out so that particle size was controlled within a desired range, and filtering was conducted to create the ceria slurry 11.

Finally, in the case of the sample of comparative example, 10 kg of ceria powder, which was synthesized under the above-mentioned conditions, and 90 kg of deionized water were mixed in a high speed mixer for 1 hour or more so as to achieve sufficient wetting, and the mixture, that is, 10 wt % slurry, was milled using a pass-type milling process. Through the milling process, particle size was controlled within a desired range and agglomerated particles in the slurry were dispersed. Subsequently, 1 wt % ammonium polymethacrylate as the anionic dispersing agent based on the ceria powder was further added thereto, and dispersion was conducted by mixing for 2 hours or more in consideration of adsorption thereof. Next, filtering was conducted to prepare the sample of comparative example 2.

The present invention is not limited to the above-mentioned time and amount, but the stage at which the dispersing agent is added and the amount of dispersing agent added may be changed. As described above, the anionic dispersing agent is added to deionized water, and the ceria powder is then mixed with deionized water. The resulting mixture is milled and filtered to produce the slurry. Furthermore, in the present invention, the slurry may be created through the following procedure. After the ceria powder is mixed with deionized water to achieve sufficient wetting, the anionic dispersing agent is added thereto, and the resulting mixture is milled/dispersed using a milling machine and filtered to remove large particles, thereby the slurry is created. Alternatively, the anionic dispersing agent and the ceria powder may be added to deionized water, mixed, milled, and filtered to produce slurry.

Meanwhile, in the present invention, the dispersing agent is added using various methods before the milling as described above, and deionized water, which is mixed with the dispersing agent and the ceria crude powder, is milled. In connection with this, the anionic dispersing agent is further added at least one time during the milling, the milling/dispersion are carried out, and filtering is conducted, thereby the slurry is created. Alternatively, in the present invention, the dispersing agent may be further added after the milling is finished. Where the dispersing agent is added a few times as described above, it is possible to control the amount of dispersing agent added per time, which is dependent on the number of additions of the dispersing agent. For example, the dispersing agent may be added in the amount of 0.0001-10 wt % based on the polishing particles in such a way that the dispersing agent is added in deionized water in the amount of 100-50% based on the total amount of dispersing agent, and that the dispersing agent is added in the course of milling the mixture in the amount of 50% or less based on the total amount of dispersing agent.

Meanwhile, a predetermined additive may be added after the milling.

(3) Comparison of the Ceria Slurries 9 to 11 and CMP Test Results

Objects were polished using the ceria slurries produced as described above, and, in this case, the removal rate, the number of scratches, and removal selectivity were evaluated, thereby the slurries were compared to each other. CMP polishing performance tests for the objects were carried out using the ceria slurries 9 to 11 produced as described above. In connection with this, a CMP device, an object wafer, test conditions, and consumption substances were the same as those of the above evaluation.

the case of comparative example 2, the dispersing agent is adsorbed only on surfaces of agglomerated particles in the slurry and also interposed between the agglomerated particles without adsorption. Therefore, it is possible to minimize the agglomeration of ceria slurry by changing the stage at which the dispersing agent is added, the method of adding it, and the method of using dispersing devices.

As described above, in the present invention, the amount of dispersing agent added is controlled and the stage at which the dispersing agent is added is changed depending on the predetermined pH condition in order to control dispersion stability of the ceria slurry, thereby it is possible to easily produce the slurry which is capable of minimizing micro-scratches and maintaining a high removal rate and selectivity.

A detailed description will be given below of a method of polishing a substrate using the above-mentioned slurry.

In the method of polishing the substrate according to the present invention, a predetermined substrate is polished using a polishing slurry in which the agglomeration of polishing particles is minimized and dispersion stability is improved by controlling calcination process conditions, the amount of dispersing agent added, and the stage at which it is added.

Preferably, the method comprises preparing the substrate on which a polishing layer and a polishing stopper layer are formed, and polishing the polishing layer using the polishing slurry in which the agglomeration of the polishing particles is

TABLE 7

|  | Stage at which dispersing agent is added | dD50 | Removal rate of oxide film (Å/min) | Removal rate of nitride film (Å/min) | Removal ratio of oxide:nitride (selectivity) | WIWNU (%) | Oxide film residual particles (>0.20 μm, #) | Scratches (#) |
|---|---|---|---|---|---|---|---|---|
| Slurry 9 | Before milling | 8 | 2521 | 49 | 51.4 | 1.0 | 150 | 1 |
| Slurry 10 | Before milling and during milling | 3 | 2492 | 50 | 49.8 | 1.0 | 50 | 0 |
| Slurry 11 | During milling | 25 | 2462 | 49 | 50.2 | 1.0 | 130 | 2 |
| Comp. Exm. 2 | After milling | 157 | 2521 | 50 | 50.4 | 1.0 | 680 | 10 |

The CMP test was conducted using the ceria slurries 9 to 11, which were produced so as to have different times for adding the dispersing agent as described above, under the same CMP conditions, and the results are described in Table 7. The slurries all have fair removal rate and removal selectivity (ratio of oxide film removal to nitride film removal), and also excellent within-wafer-nonuniformity (WIWNU) which indicates removal uniformity of the polished wafer during the polishing process. However, in view of the numbers of micro-scratches and oxide film residual particles which are still important in a highly integrated semiconductor process, the ceria slurries 9 to 11 are very different from that of comparative example 2. That is to say, in the case of the ceria slurries 9 to 11, in which the dispersing agent is added before and/or during the milling process, agglomeration of the slurry is reduced and dispersion stability is improved, thus the numbers of micro-scratches and oxide film residual particles are significantly reduced in comparison with comparative example 2 in which the dispersing agent is added after milling. The reason is that, in the case of the ceria slurries 9 to 11, when novel surfaces are formed, the dispersing agent is relatively nicely adsorbed on the newly formed surfaces, but, in minimized and dispersion stability is improved by controlling the calcination process conditions, the amount of dispersing agent added, and the stage at which it is added. The polishing slurry consists of an oxide-based material layer, and the polishing stopper layer consists of a nitride-based material layer.

As described above, in the present invention, it is possible to produce a slurry having excellent physical properties which are essential in a polishing agent for an STI CMP process during the fabrication of a semiconductor. Particularly, it is possible to decrease scratches and residual particles which cause fatal defects in a device after CMP.

Furthermore, in the present invention, it is possible to develop a slurry which is capable of reducing the number of micro-scratches causing defects in a device and maintaining a high removal rate during a CMP process by controlling the surface area per unit weight of polishing particles and the addition amount and stage of a dispersing agent, depending on calcination process conditions, so as to improve the dispersion stability.

As well, in the present invention, it is possible to produce a slurry which has excellent physical properties essentially required as a polishing agent for STI CMP. Accordingly, when the slurry is used as the polishing agent for STI CMU, it can be applied to various patterns required in the course of producing ultra highly integrated semiconductors, and thus excellent removal rate, removal selectivity, and within-wafer-nonuniformity (WIWNU), which indicates removal uniformity, as well as minimal occurrence of micro-scratches, can be assured.

What is claimed is:

1. A polishing slurry having a conductivity of 300-900 μs/cm and a pH of 7-11, which comprises polishing particles having a surface area per mass of 1-100 $m^2/g$, deionized water, and a dispersing agent in the amount of 0.0001-10.0 weight % based on the polishing particles, in which agglomeration of the polishing particles is minimized and the difference between the median diameter of the polishing particles before and after forcible dispersion treatment is 30 nanometers or less, by controlling an amount of the dispersing agent added or a stage at which the dispersing agent is added.

2. The polishing slurry as set forth in claim 1, wherein the difference between the median diameter of the polishing particles before and after forcible dispersion treatment is 10 nanometers or less.

3. The polishing slurry as set forth in claim 1, wherein conductivity of the polishing slurry is 500-600 μs/cm.

4. The polishing slurry as set forth in claim 1, wherein the dispersing agent is made of an anionic polymer compound, and the anionic polymer compound is at least one selected from a group consisting of polymethacrylic acid, polyacrylic acid, ammonium polymethacrylate, ammonium polycarboxylate, and carboxyl-acryl polymer.

5. The polishing slurry as set forth in claim 1, wherein the polishing particles are ceria.

* * * * *

UNITED STATES PATENT AND TRADEMARK OFFICE
CERTIFICATE OF CORRECTION

PATENT NO. : 8,361,177 B2
APPLICATION NO. : 12/333170
DATED : January 29, 2013
INVENTOR(S) : Dae Hyeong Kim et al.

It is certified that error appears in the above-identified patent and that said Letters Patent is hereby corrected as shown below:

Title page, Item 75, "Un Gyu Park" should be replaced with --Un Gyu Paik--;

In the Specification

Column 1, line 6, "July 28, 2005 now abandoned" should be replaced with --July 28, 2005, now abandoned--;

Column 17, line 8, "unifommity (WIWNU)" should be replaced with --uniformity (WIWNU)--;

Column 21, line 1, "polishing agent for STI CMU" should be replaced with --polishing agent for STI CMP--.

Signed and Sealed this
Eighteenth Day of June, 2013

Teresa Stanek Rea
*Acting Director of the United States Patent and Trademark Office*